US009360092B2

(12) United States Patent
Naubert et al.

(10) Patent No.: US 9,360,092 B2
(45) Date of Patent: Jun. 7, 2016

(54) PNEUMATICALLY ACTUATED DECOUPLING DEVICE

(71) Applicant: Airbus Defence and Space GmbH, Ottobrunn (DE)

(72) Inventors: Alexander Naubert, Munich (DE); Markus Christmann, Munich (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 106 days.

(21) Appl. No.: 14/456,595

(22) Filed: Aug. 11, 2014

(65) Prior Publication Data

US 2015/0041278 A1 Feb. 12, 2015

(30) Foreign Application Priority Data

Aug. 12, 2013 (EP) .................................... 13004003

(51) Int. Cl.
| | |
|---|---|
| *F16D 25/12* | (2006.01) |
| *F16H 19/02* | (2006.01) |
| *F16D 11/12* | (2006.01) |
| *B64C 13/42* | (2006.01) |
| *B64C 13/50* | (2006.01) |
| *F16H 25/20* | (2006.01) |
| *F16D 48/02* | (2006.01) |
| *F16H 25/22* | (2006.01) |

(52) U.S. Cl.
CPC ................ *F16H 19/02* (2013.01); *B64C 13/42* (2013.01); *B64C 13/50* (2013.01); *F16D 11/12* (2013.01); *F16H 25/205* (2013.01); *F16D 2048/0203* (2013.01); *F16H 25/2204* (2013.01); *F16H 2025/2071* (2013.01)

(58) Field of Classification Search
CPC ................ F16H 19/02; F16H 25/205; F16H 2025/2071; F16H 25/2204; B64C 13/50; B64C 13/42; F16D 11/12; F16D 2048/0203
See application file for complete search history.

(56) References Cited

U.S. PATENT DOCUMENTS

| | | | |
|---|---|---|---|
| 3,902,379 A | 9/1975 | Bennett et al. | |
| 2002/0134180 A1* | 9/2002 | Gorin ................ | F16H 25/2015 74/89.37 |
| 2006/0048602 A1* | 3/2006 | Biester ............... | F16H 25/20 74/841 |
| 2008/0203234 A1* | 8/2008 | Haase ................ | B64C 13/42 244/224 |
| 2011/0146434 A1 | 6/2011 | Short et al. | |
| 2012/0018275 A1 | 1/2012 | Voth et al. | |
| 2012/0090418 A1* | 4/2012 | Barthlein ............. | F16D 65/18 74/424.81 |
| 2015/0060602 A1* | 3/2015 | Naubert .............. | F16H 25/2025 244/99.3 |

OTHER PUBLICATIONS

European Search Report dated Jan. 23, 2014 with partial English translation thereof {Five (5) pages}.

\* cited by examiner

*Primary Examiner* — David J Hlavka
(74) *Attorney, Agent, or Firm* — Crowell & Moring LLP

(57) ABSTRACT

A pneumatic decoupling device for an electromechanical actuator, in particular, for flight applications includes a pressure accumulator housing for storing a compressed gas, which can be released to a decoupling mechanism of an electromechanical actuator for separating the drive components, so that in the event of a decoupling the electromechanical actuator runs totally freely.

15 Claims, 5 Drawing Sheets

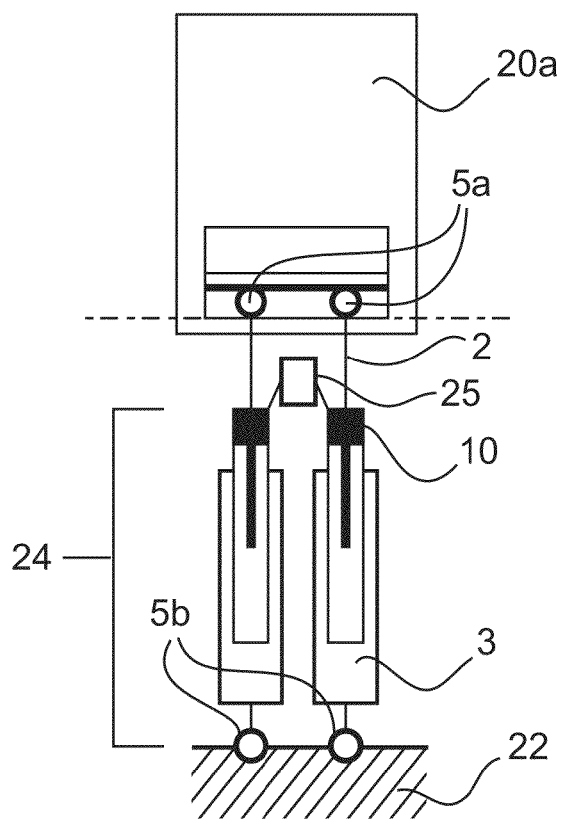
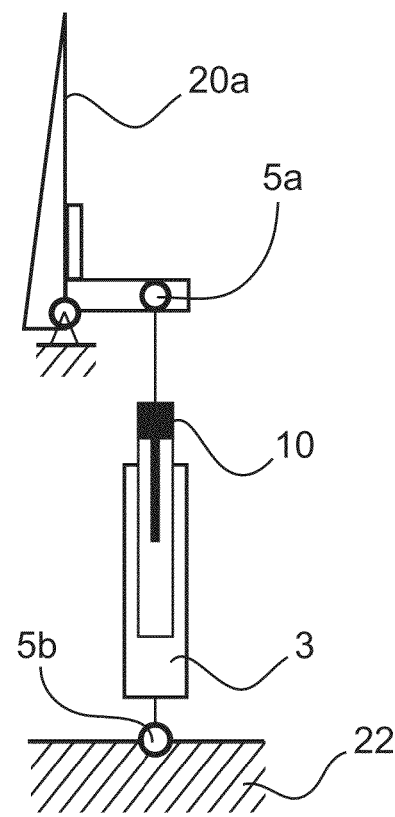
Fig.2a          Fig.2b
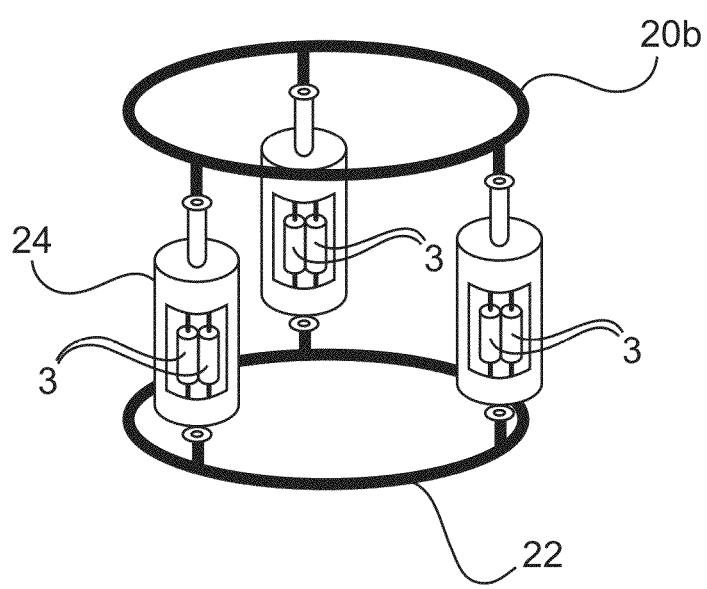
Fig.2c

PNEUMATICALLY ACTUATED DECOUPLING DEVICE

CROSS-REFERENCE TO RELATED APPLICATIONS

This application claims priority under 35 U.S.C. §119 to European patent application 13004003.3-1754, filed Aug. 12, 2013, the entire disclosure of which is herein expressly incorporated by reference.

BACKGROUND AND SUMMARY OF THE INVENTION

Exemplary embodiments of the present invention relate to aircraft technology. In particular, exemplary embodiments of the present invention relate to actuator technology for aerodynamically effective elements of an aircraft. Furthermore, exemplary embodiments of the present invention relate, in particular, to a pneumatic decoupling device, an actuator element, an actuator assembly, as well as an aircraft, in particular, an airplane or a helicopter.

Actuators are used in aircrafts, in order to move elements of the aircraft by mechanical means and to change the elements in their position or orientation. In airplanes these elements are, for example, the rudders or elements of the wings, in order to influence the upward lift characteristic of the airplanes. In helicopters these elements can influence, for example, the varying angle of pitch of the rotor blade by means of a swash plate.

Such actuators are typically designed as hydraulic elements, because to date it has been possible to master this technology and because this technology is less subject to faults. When a fault occurs, conventional hydraulic actuators can still be moved in most cases. In other words, they do not block when a fault occurs.

The increasing electrification of the aircraft has made it desirable to replace hydraulic actuators, which in some cases might require that the hydraulic system run throughout the entire aircraft, with electric actuators. These electric actuators can be powered strictly electrically, whereby such electric connections are usually easier to install in an aircraft than, for example, hydraulic lines. At this point a movement generated by such an electric actuator can also be implemented strictly electrically, for example, with the help of a suitable drive by means of an electric motor; a local hydraulic system can also be provided at the actuator, in particular, a hydraulic system, which is disposed in the actuator system and which also has only to be supplied with electric energy from the outside.

Figure 1A:
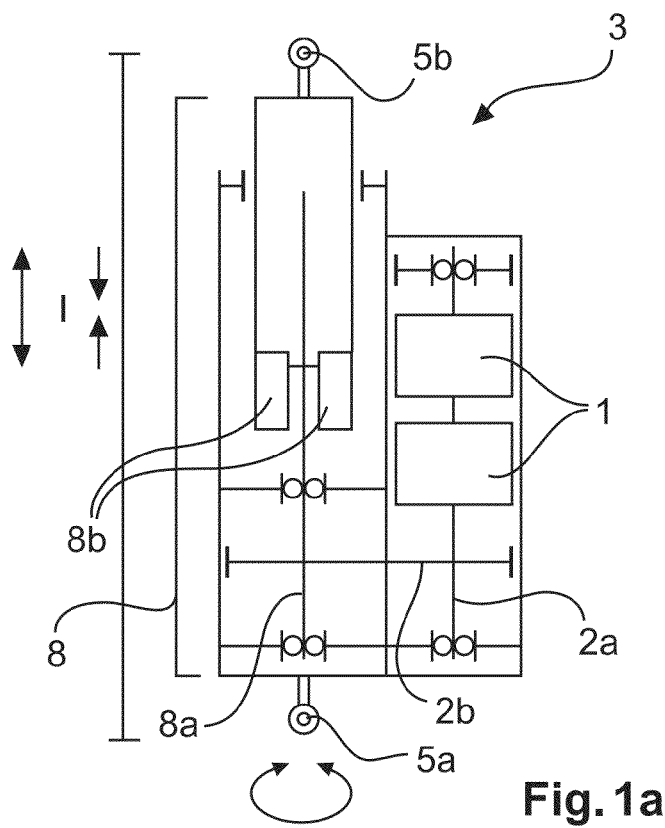

FIG. 1a shows a schematic drawing of an electromechanical actuator.

For example, two motor elements 1 are attached to the drive unit 8 of the actuator element 3 by means of the use of a suitable attachment, consisting of a motor shaft 2a and a suitable transmission 2b. The drive unit 8 is variable in its length l, in particular, in its distance between the two attachment points 5a, b, so that a variation in the length of the drive unit 8 of the actuator element 3 changes the distance between the attachment points 5a, b. By suitably clamping between the elements this approach makes it possible, for example, to move or tilt an aerodynamically effective structure. The drive unit 8 consists of a first drive element 8a and a second drive element 8b, constructed, for example, as a ball screw 8 with a spindle nut 8b and a drive spindle 8a. When the drive spindle 8a is rotated, the spindle nut 8b can be pushed onto the drive spindle, so that the rotation of the drive spindle 8a provides a change in the length of the drive unit 8 and, as a result, a change in the length of the actuator element 3 or more specifically a change in the distance between the attachment points 5a, b. In the event that an actuator element is defective, in particular, in the event that mission-critical, aerodynamically effective surfaces are defective, it has to be ensured that, despite the defect, they can at least still be moved. In the case that an actuator element fails, a certain degree of redundancy is provided as a function of the specific application. In the case of tails or rudders, it is possible, for example, to arrange a second actuator element in a force parallel manner relative to the first actuator element, so that the change in the position or orientation of the aerodynamically effective surface can be perceived by one of the two actuator elements or also by both actuator elements together. If at this point one of the two parallel actuator elements fails, then the other actuator element can at least maintain the function. However, even more relevant in this context are the defects of the actuator elements that no longer allow, therefore, a length variation to be carried out. For example, the rupture of a ball of the ball screw might block the drive spindle and the spindle nut in relation to each other, so that it is no longer possible to change the length of the actuator element. In such a case the actuator element that is arranged in parallel can no longer perform a control function of the aerodynamically effective surface. In the worst case scenario it would no longer be possible to control the airplane; and, as a result, the airplane might crash.

In order to continue to keep the electromechanical actuator element variable in its length, even when a fault occurs, decoupling devices or more specifically decoupling mechanisms can be integrated into the actuator elements. When a fault occurs, the decoupling devices enable such a decoupling, in order to be able to continue to generate a suitable force, at least by supplying a force from the outside, for example, by means of an actuator element that is arranged in a force parallel manner, in order to keep the aerodynamically effective surfaces in operation, while at the same time the defective actuator element is changed in its length by means of the force from the outside and, as a result, does not block the movement of the aerodynamically effective surface.

Figure 1B:
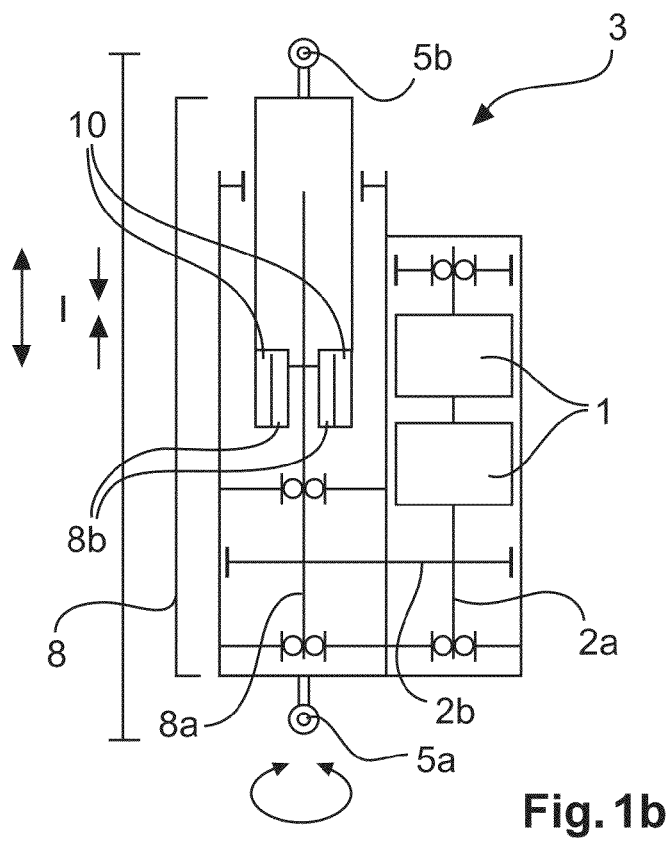

FIG. 1b shows an exemplary embodiment of such an actuator element. In the final analysis the only distinction between the embodiment from FIG. 1b and that of FIG. 1a is the provision of a decoupling device 10. In this case the decoupling device 10 does not merely decouple the two drive elements 8a, b from each other, but rather a decoupling process is performed in such a way that the engagement points 5a, b are decoupled. In this respect one of the engagement points is more or less connected to both drive elements of the drive unit even in the decoupled state, while the connection of a drive element to the second engagement point 5b is released. As a result, the length of the actuator element can be changed, independently of whether a mechanism of the drive unit, for example, the first drive element 8a to the second drive element 8b, is blocked.

One aspect of the present invention is directed to a decoupling device for an actuator element.

According to a first embodiment of the present invention, a pneumatic decoupling device is provided for an electromechanical actuator element, the pneumatic decoupling device comprising at least one pressure accumulator element with at least one outlet and at least one tripping mechanism, configured to release the pressure, stored in the pressure accumulator element, in a controlled fashion. The outlet of the pressure accumulator element can be coupled to an electromechanical actuator element, so that, when the tripping mechanism is tripped, the pressure, stored in the pressure accumulator element, can be released to the mechanical actuator element, in order to trigger a decoupling function in the electromechanical actuator element.

An additional embodiment of the present invention discloses an actuator element, comprising a drive unit with a first drive element and a second drive element, wherein the first drive element and the second drive element interact operationally in such a way that they effect a variation in the length of the actuator element. Furthermore, the actuator element has a decoupling mechanism, which operationally decouples the actuator element, so that the variation in the length of the actuator element is made possible, independently of the drive unit, in particular, without operationally decoupling the first drive element and the second drive element. Furthermore, the actuator element comprises, according to the present invention, a decoupling device, operationally coupled to the decoupling mechanism and configured to make the stored pressure available to the decoupling mechanism, so that when the pressure is provided, the decoupling mechanism operationally decouples the actuator element.

Another embodiment of the present invention discloses an actuator assembly, comprising at least two actuator elements according to the present invention, wherein the at least two actuator elements are arranged in a force parallel manner, so that a variation in the length of the actuator assembly can be effected by one actuator element alone or by both actuator elements in parallel; and wherein one decoupling device, according to the present invention, is attached to the actuator elements.

An additional embodiment of the present invention discloses an aircraft, in particular, an airplane or a helicopter, comprising an actuator assembly, according to the present invention, and/or an actuator element, according to the present invention.

One aspect of the present invention is the provision of a decoupling device for an electromechanical actuator element, which works based on a pneumatic principle. In other words, the decoupling device, according to the invention, comprises a pressure accumulator element, in the interior of which gas having a positive pressure is stored, and, as a result, the pressure accumulator element is configured to release this pressure to other elements through expansion of the gas, for example, in the directed outflow by means of the use of an outlet. If in the context of the present invention the topic under discussion is a pressure release and/or a stored pressure, these two concepts may be construed as the force released by the compressed gas due to its positive pressure.

In this respect the stored pressure in the decoupling device is released to an electromechanical actuator, which is configured to carry out a decoupling of its drive elements, as a result of the pressure it has received, in particular, a decoupling of the attachment points of the actuator element, wherein in the end their distance represents the effective length of the actuator element for adjusting the aerodynamic effective surfaces in an aircraft. However, ultimately the decoupling device, according to the invention, is separated from a concrete implementation of an actuator element, as long as the actuator element is configured to carry out the decoupling as a result of the pressure it has received. In this case even the specific embodiment of the decoupling device is defined in essence only by the fact that it provides a suitable pressure accumulator element, which in turn can release in a controlled fashion the stored pressure by means of a suitable tripping mechanism, when a fault occurs and/or when the electromechanical actuator is decoupled. The effect and, thus, the decoupling in the actuator element as a result of the stored pressure is hereinafter a functionality that is to be represented by the actuator element itself.

A preferred embodiment of the present invention can provide a pressure determining device for determining the pressure in the pressure accumulator element. In this case the pressure determining device may be designed as a device from the group, consisting of a visual pressure determining device, a mechanical pressure determining device, an electronic pressure determining device and/or a pressure sensor disposed in the pressure accumulator element.

In order to check the flawless function of the pneumatic decoupling device, it is relevant for this purpose to be able to determine in essence that the pressure, which is stored or more specifically present in the pressure accumulator element, is sufficient for tripping an actuator element. As a result, it is preferred that a pressure determining device for determining the pressure in the pressure accumulator element be provided. Such a pressure determining device can be designed, for example, as a visual pressure determining device, for example, a spring element in the wall of the pressure accumulator element, which is forced outwards as a result of the pressure prevailing in the pressure accumulator element, and which has a visual indicator. It is also possible to provide a mechanical pressure determining device, in which, for example, the above described spring element is inserted, moved, and/or pressed into the pressure accumulator element by hand, for example, by a service technician, on site. This spring element in turn assumes that there is sufficient pressure in the pressure accumulator element to move the spring elements outwards as a result of the positive pressure. It is also conceivable to provide an electronic pressure determining device, as such a pressure sensor, that is disposed in the pressure accumulator element.

According to an additional preferred embodiment of the present invention, the pressure accumulator element may have at least two outlets, wherein an electromechanical actuator element can be connected to each of the at least two outlets; and wherein the tripping mechanism is designed to release the stored pressure to an electromechanical actuator element by means of the use of one of the at least two outlets, wherein, following release of the stored pressure to an electromechanical actuator element, the decoupling function of the second electromechanical actuator element can no longer be triggered by means of the decoupling device.

As described above, the actuator assemblies are provided for flight-relevant, aerodynamically effective surfaces, so that, when an actuator element is defective, the function of adjusting the aerodynamically effective surface is taken over by the second actuator element, which is arranged in a force parallel or more specifically action parallel manner; and, thus, the functionality or more specifically the airworthiness of the aircraft can be maintained. If, however, a fault should occur with the effect that a decoupling device of an actuator element decouples (simultaneously) both actuator elements of an actuator assembly, then this event would also mean the loss of the ability to control the aerodynamically effective surface and, thus, possibly the entire aircraft.

For this reason it is preferred to provide a decoupling device, which supplies, for example, two actuator elements, which are arranged in a force parallel manner, jointly with a decoupling functionality. In this case the decoupling device is configured to provide exclusively one of the two actuator elements with a functionality that can be used for decoupling the actuator element or more specifically for tripping the decoupling mechanism of the corresponding actuator element. Therefore, based specifically on the case of a pneumatic decoupling device with a pressure accumulator element, a pressure accumulator element can be connected to the decoupling mechanisms of two actuator elements, which are arranged in a force parallel manner. In this context the pressure accumulator element stores only an amount of pressure that is required to decouple one of the two actuator elements. In other words, when the pressure accumulator element has released pressure to an actuator element for decoupling, the pressure accumulator element can no longer have enough pressure to decouple, in addition, the second actuator element that is arranged in a force parallel manner. This arrangement significantly augments the safety during the normal operating mode, because both actuator elements cannot be decoupled by mistake. In another possible embodiment a suitable outlet port in the decoupling mechanism is opened by actuating the decoupling mechanism, so that, upon exercising the decoupling function, the pressure, which has remained in the pressure accumulator element, can escape through the outlet port in the decoupling mechanism. This approach makes it possible to improve the safety, because the second actuator element cannot also be decoupled by mistake.

According to an additional preferred embodiment of the present invention, the tripping mechanism may be designed as a single tripping mechanism, configured to release the pressure selectively by means of each of the at least two outlets; or the tripping mechanism may be designed as a multiple tripping mechanism, wherein each of the outlets is assigned a tripping mechanism of the multiple tripping mechanism. In other words, a multiple tripping mechanism comprises parallel or more specifically redundant tripping mechanisms.

As a result, such an approach ensures, in particular, that of the two force-parallel actuator elements only one actuator element can be decoupled. In the case of a single tripping mechanism, it can be designed in such a way that it releases or more specifically opens either one or the other outlet of the pressure accumulator element and, as a result, releases the stored pressure to the decoupling mechanism of an actuator element. In the case of a multiple tripping mechanism, each tripping mechanism can be controlled separately. In the event that one tripping mechanism was already tripped, then the other can be made functional by electronic means or by other suitable measures. Both measures can ensure that only one of the two force-parallel actuator elements of an actuator assembly can be decoupled, in particular, no simultaneous decoupling of both actuator elements that are arranged in a force parallel manner.

According to another preferred embodiment of the present invention, the tripping mechanism may be designed as a positive locking element with a first force element, a second force element and a drive element, wherein the first force element is configured to hold a positive engagement of the positive locking element; wherein the drive element is configured to release the positive engagement against the action of the force of the first force element; and wherein, when the positive engagement is released, the second force element is configured to release the pressure, stored in the pressure accumulator element, by means of the outlet. In particular, the direction of force of the first force element and the second force element may not be oriented parallel or in essence perpendicular to each other.

Such an embodiment or more specifically arrangement offers the advantage that the positive engagement of the positive locking element can be held more or less force neutral and, in particular, does not have to be held against the direction of force of the second force element. This approach can ensure, in particular, that, when the positive engagement is closed, there is no need to generate a counter-force that, when a fault occurs in the event of an absence of this force, would result in a more or less automatic and undesired triggering of the release of the pressure from the pressure accumulator element. In addition, the forces of the first and second force element can be significantly different. The first force element can hold only the positive engagement, whereas the second force element can generate a force, in order to release the pressure, stored in the pressure accumulator element. It is also possible, for example, that the force of the drive element that is required to release the positive engagement may turn out to be comparatively small and, in particular, may be independent of the action of the force of the second force element to release or rather to output the stored pressure. While, for example, the first force element can be a comparatively small spring force element in order to hold the positive locking element in a recess, the second force element can be a comparatively strong spring force element in order to trip the tripping mechanism.

According to an additional preferred embodiment of the present invention, the pressure in the pressure accumulator element can be held by means of a sealing effect of a sealing element, which is arranged in the at least one outlet. In this case the tripping mechanism can be configured to cancel, in particular, to irreversibly cancel, the sealing effect, and, thereby, for example, to destroy or to damage the sealing element, so that its sealing effect can no longer be maintained to its full extent. In particular, the second force element can be designed to exert a force on the sealing element, so that the sealing effect is cancelled; and the pressure, stored in the pressure accumulator element, is released by means of the outlet.

Such a sealing element can be, for example, the provision of a diaphragm element, which is made, for example, of a suitable plastic material or metal, which is punctured by means of the tripping mechanism, in particular, with the use of the force provided by the second force element. Thus, the tripping mechanism can at least partially destroy the sealing element, so that a pressure connection between the outlet and the pressure accumulator element is established, as a result of which the pressure, stored in the pressure accumulator element, can be released to an actuator element by means of the use of the outlet.

According to another preferred embodiment, the actuator element may have two attachment points exhibiting a distance that can be determined by changing the length of the actuator element. In this case one of the drive elements can be connected in a more or less operatively direct manner to one of the attachment points; and wherein the decoupling mechanism is connected in a more or less operatively direct manner to the other one of the attachment points; and wherein in the coupled state of the decoupling mechanism, the distance between the two attachment points, thus the effective length of the actuator element, can be adjusted by means of the actuator element, in particular, its drive unit; and wherein in the decoupled state of the decoupling device the distance between the two attachment points can be changed by applying a force to the attachment points from the outside.

As a result, an actuator element, according to the invention, knows two different operating modes. In this case one operating mode shall be treated as equal to a conventional normal operation, in which the actuator element has a drive unit, which can effect, suitably actuated, a variation in the length of the actuator element. As a result of this option of a controlled variation of the length, it is possible to use the actuator element to influence in a targeted way the position and/or orientation of an aerodynamically effective surface of an aircraft.

In the second state, in the decoupled state, the actuator element is no longer capable of providing by itself its length variation function, at least not to the full extent, due to, for example, a defect of the drive unit. In the decoupled state it is now ensured that the variation in the length of an actuator element, arranged in a force parallel manner, is not blocked or rather suppressed by the defective actuator element. Due to the decoupling mechanism the drive unit is now decoupled in such a way that a variation in the length of the decoupled actuator element can be carried out by tension or pressure on the attachment points. In this respect it is preferred that the first drive element and the second drive element be not simply decoupled, because when a fault occurs, as a result of which the first drive element and the second drive element are mutually blocked, such a decoupling might not be feasible.

According to an additional preferred embodiment of the present invention, the drive unit can be designed as a ball screw, wherein the first drive element and the second drive element can be designed as a drive spindle and a spindle nut of the ball screw.

In this case a ball screw can be a preferred option to effect the variation in the length of an actuator element, while a drive unit, which is designed in this way, has sufficient stability and can transmit an appropriately large force.

Another preferred embodiment of the present invention discloses an actuator assembly, wherein in the case of a defect of a drive unit of an actuator element, the decoupling device trips the decoupling mechanism of this actuator element, so that the actuator element is operationally decoupled, while the variation in the length of the actuator assembly can still be effected by the non-decoupled actuator element.

In other words, two actuator elements, which are arranged in a force parallel or rather action parallel manner, are provided, for example, in the actuator assembly. In the case of a defect of an actuator element, this actuator element can be decoupled by means of the use of the decoupling device, so that then the length of this actuator can be changed by a force, which is provided from externally, in particular, at its attachment points. This external force can be generated, for example, by the second actuator element, which is arranged in a force parallel or rather action parallel manner. As a result, this second actuator element can adjust the position of an aerodynamically effective surface and, in so doing, can simultaneously extend or shorten the decoupled actuator element analogous to its own length.

BRIEF DESCRIPTION OF THE DRAWING FIGURES

Some exemplary embodiments of the invention are described in greater detail below with reference to the accompanying drawings. The drawings show in:

FIGS. 1a, b a schematic representation of an electromechanical actuator according to the present invention.

FIGS. 2a-c an exemplary embodiment of the actuator elements and/or an actuator assembly according to the present invention.

Figure 3:
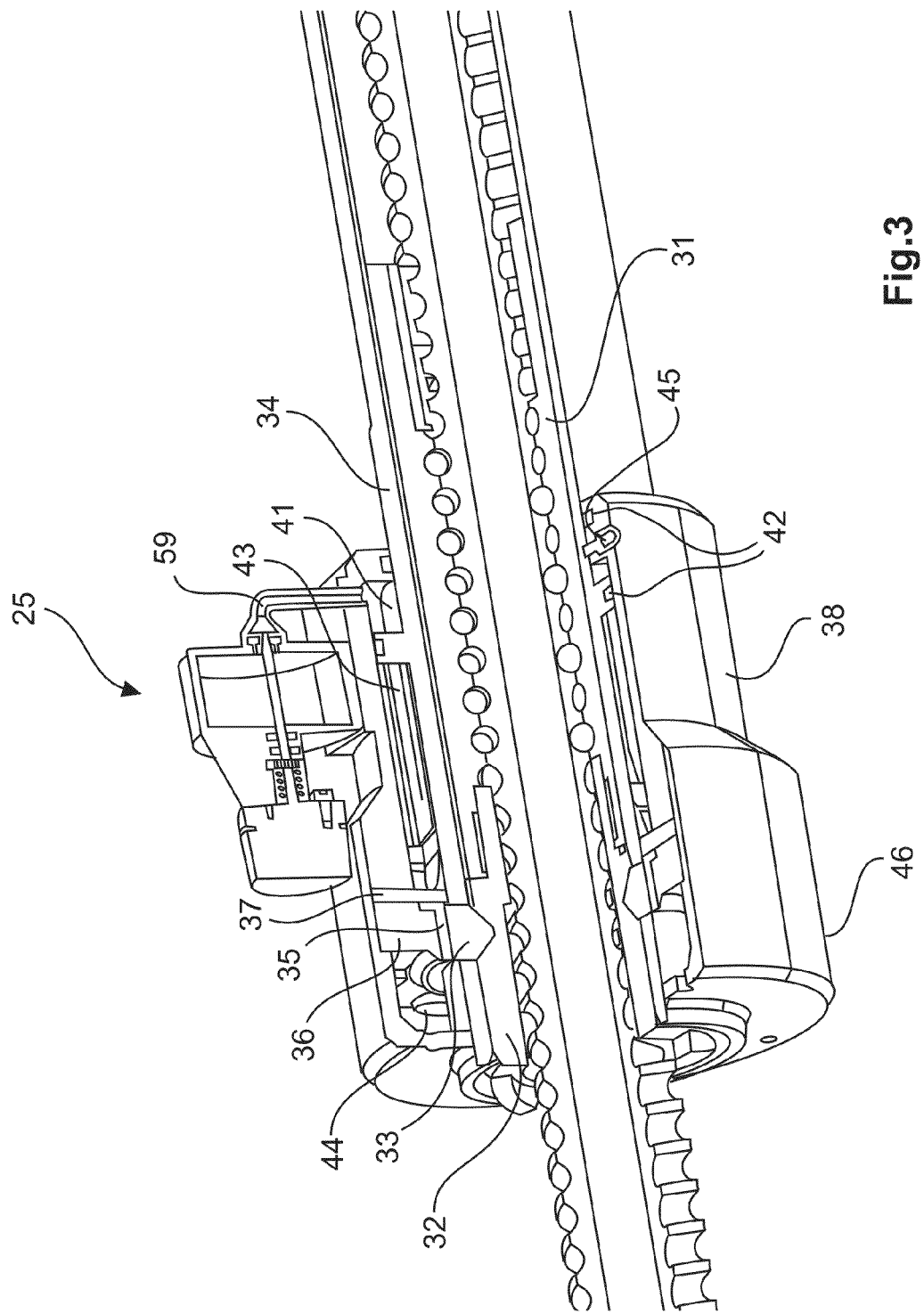

FIG. 3 a detailed view of an actuator element according to the present invention.

Figure 4A:
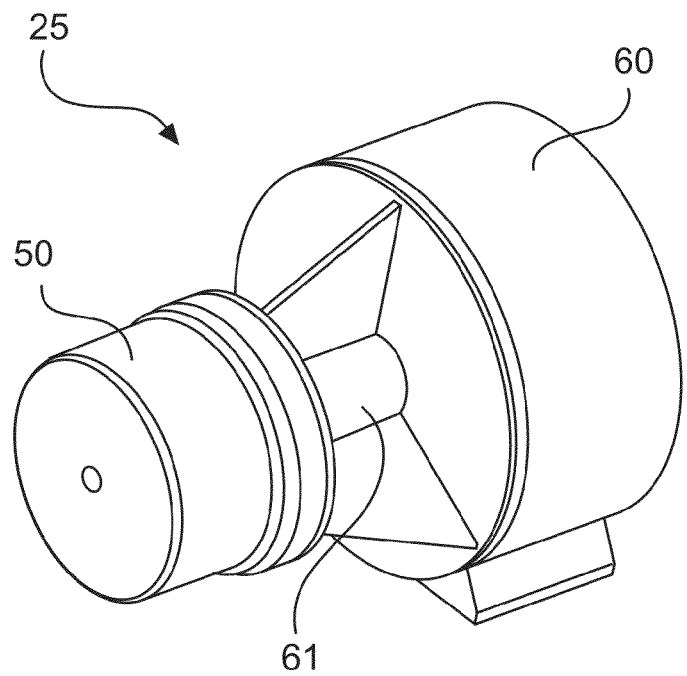
Figure 5A:
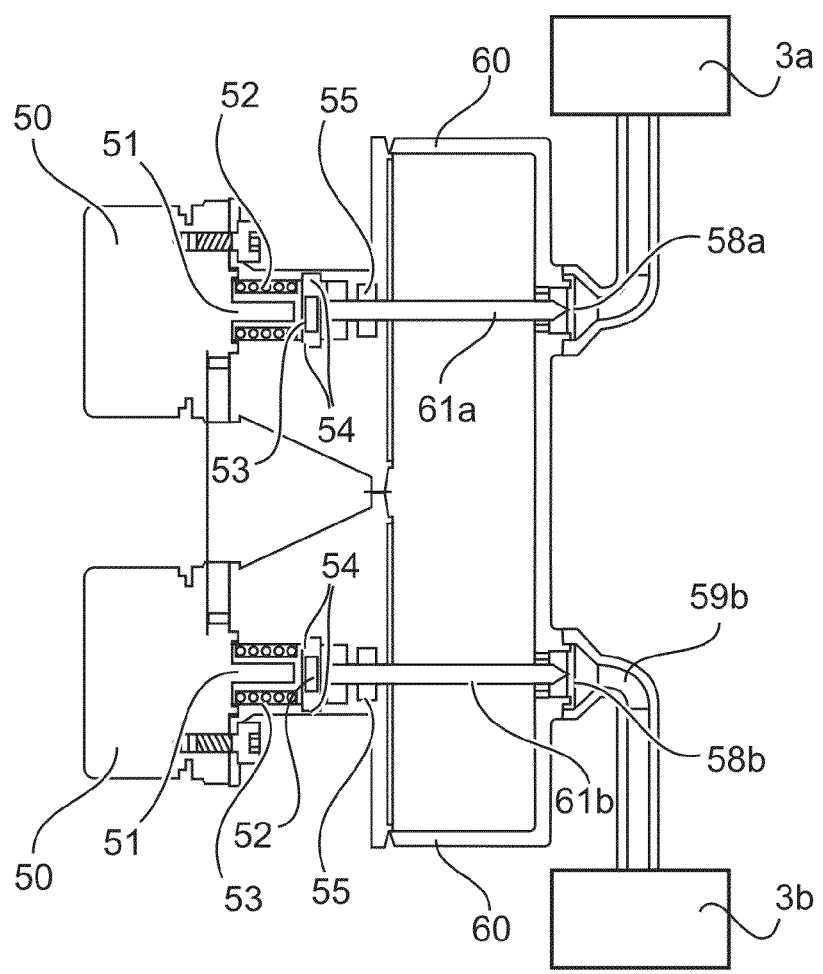

FIGS. 4a, b an exemplary embodiment of a decoupling device according to the present invention; and FIGS. 5a, b additional exemplary embodiments of decoupling devices according to the present invention.

DETAILED DESCRIPTION

Referring to FIGS. 2a-c, some exemplary embodiments of the actuator elements and/or an actuator assembly according to the present invention are disclosed.

FIGS. 2a, b show, by way of example, the use of an inventive actuator assembly 24 for actuating an aerodynamically effective surface 20a of an airplane. In this case such a surface may be, for example, a control surface or a surface of the wings that influences the upward lift. The actuator assembly 24 consists of two force-parallel or rather action-parallel actuator elements 3, which, on the one hand, are attached at a fixed point on the airplane structure 22 and, on the other hand, communicate with the aerodynamically effective element 20a. A suitable lever mechanism makes it possible to adjust the angular position of the aerodynamically effective element 20a by making the actuator assembly 24 longer or shorter. In this context each actuator element 3 has a drive unit comprising a first drive element and a second drive element, which, however, are not shown in detail in FIGS. 2a, b. Each actuator element 3 can be adjusted on its own with its drive units, in order to adopt a defined length, consequently to adjust a distance between the attachment points 5a and 5b. As illustrated in FIG. 2b, when the actuator 3 is lengthened, the aerodynamically effective surface 20a tilts to the left owing to the lever, whereas it tilts to the right, as soon as the actuator 3 is shortened. As can be seen in FIG. 2a, the two actuator elements 3 of the actuator assembly 24 are attached in parallel between the airplane structure 22 and the aerodynamically effective element 20a. As a result, each actuator element 3 can achieve on its own a downward angle of the aerodynamically effective surface 20a; or both actuator elements can act together on the aerodynamically effective surface 20a.

In the case that now one of the actuator elements 3 is defective in such a way that this situation results in its drive unit being blocked, then the second actuator element 3, which is arranged in an action parallel manner, would also be blocked, because then the defective actuator element represents more or less a rigid attachment having an unchangeable length, so that it would not be possible to adjust the tilt of the aerodynamically effective element 20a by means of the respectively other, still functional actuator 3. For this reason the decoupling device 25 is provided. This decoupling device acts in parallel on both decoupling mechanisms 10 of the actuator elements 3. The decoupling device allows the decoupling mechanism 10 of an actuator element 3 to be actuated in a controlled fashion, so that then the decoupled actuator can be made longer or shorter with essentially a small amount of force from the outside, in particular, a force that is introduced by way of the attachment points 5a, b.

Hence, a defective actuator element 3 can be deactivated in a force related manner with the decoupling mechanism 10, which is decoupled by means of the decoupling device 25, in such a way that the adjustment of the aerodynamically effective element 20a can be performed exclusively by the still functional actuator 3. Since only one actuator element 3 may be decoupled at the same time, the decoupling device 25 can be designed to trigger just one single decoupling process, so that only one decoupling mechanism 10 of the actuator elements 3 can be decoupled.

FIG. 2c shows the actuation of a swash plate of a helicopter. This swash plate is arranged between the helicopter structure 22 and the aerodynamically effective element 20b by means of three actuator assemblies 24. In this case the aerodynamically effective element 20b, the swash plate of a helicopter, makes it possible to vary the angle of pitch of the rotor blade, so that the helicopter can adopt a direction of movement that corresponds to the control process. Hence, it should be possible to move the swash plate 20b in three degrees of freedom (translation in a direction perpendicular to the plane, described by 22, and rotation by two axes, which extend perpendicular to each other and perpendicular to the axis of translation), as a result of which this swash plate is actuated more or less freely by means of three actuator assemblies 24. Each actuator assembly 24 in turn has two actuator elements 3, which are arranged in a force parallel manner. The internal construction of an actuator assembly 24 can be designed in accordance with FIGS. 2a, b, in that the attachment points of the actuator assembly inside the actuator assembly are coupled in a force parallel manner to the attachment points of the actuator elements 3.

At this point a decoupling mechanism of an actuator element is disclosed with reference to FIG. 3.

FIG. 3 shows a decoupling mechanism in its coupled state. The pins 33 transmit the forces between the output piston 34, which is connected to one of the attachment points, and the ball screw nut 31, while a locking sleeve 36 holds both in position. The sliding bearing 35 between the locking sleeve 36 and the pins 33 provides a small amount of friction. The locking sleeve 36, together with the energy-absorbing sleeve 37, and the tension sleeve 38 are suitably connected to each other with the connecting screws 44 and form, together with the sliding bearing 35, the sleeve assembly. In the coupled state of the decoupling device 10 the sleeve assembly can be secured, for example, by means of the locking pins 45. In order to decouple the decoupling mechanism, a gas, which generates a positive pressure, is introduced into the chamber 41, so that the pressure in the chamber 41 rises; and eventually the pressure in the chamber 41 is released. After the force, which is introduced by the pressure, exceeds a defined pressure threshold, this force in the chamber 41 prevails over a resistance, which is provided by the locking pins 45, the friction at the seals 42 and the friction between the sliding bearing 35 and the pins 33.

After the decoupling process is triggered, the sleeve assembly then moves to the right in FIG. 3 and, in so doing, releases the pins 33, while the energy-absorbing sleeve 37 is slowed down in the end stop 43. The energy-absorbing sleeve 37 and the end stop 43 can be made of a moldable, soft material, so that both elements are wedged tight into each other due to the impact. This arrangement makes it possible to avoid, in particular, a reverse movement of the sleeve assembly. As an alternative, a disk and a honeycomb structure can be used in another embodiment. In this case the honeycomb structure is compressed, when the decoupling process is triggered. A suitable construction of the pins 33 allows these pins to be forced outwards in the radial direction, since at this point the locking sleeve 36 no longer provides any support, so that the transmission of force between the drive elements of the drive unit is interrupted, and the actuator runs freely. By suitably constructing the area around the pins 33, it is possible to avoid that these pins latch again, while they stay in the housing 46 of the sleeve assembly.

At this point an exemplary embodiment of a decoupling device according to the present invention is disclosed with reference to FIGS. 4a, b.

FIGS. 4a, b show one possible embodiment of a decoupling device that can be used to actuate a decoupling mechanism, as shown in FIGS. 3a, b. The decoupling device 25 comprises a pressure accumulator element 60, which can be actuated by means of a tripping mechanism 61 in such a way that the pressure, stored in the pressure accumulator element 60, can be released. It is possible to trip the tripping mechanism 61, for example, by means of a suitable device or more specifically a motor element 50. This arrangement makes it possible to electrically trip a decoupling device, which is actually pneumatically actuated.

Figure 4B:
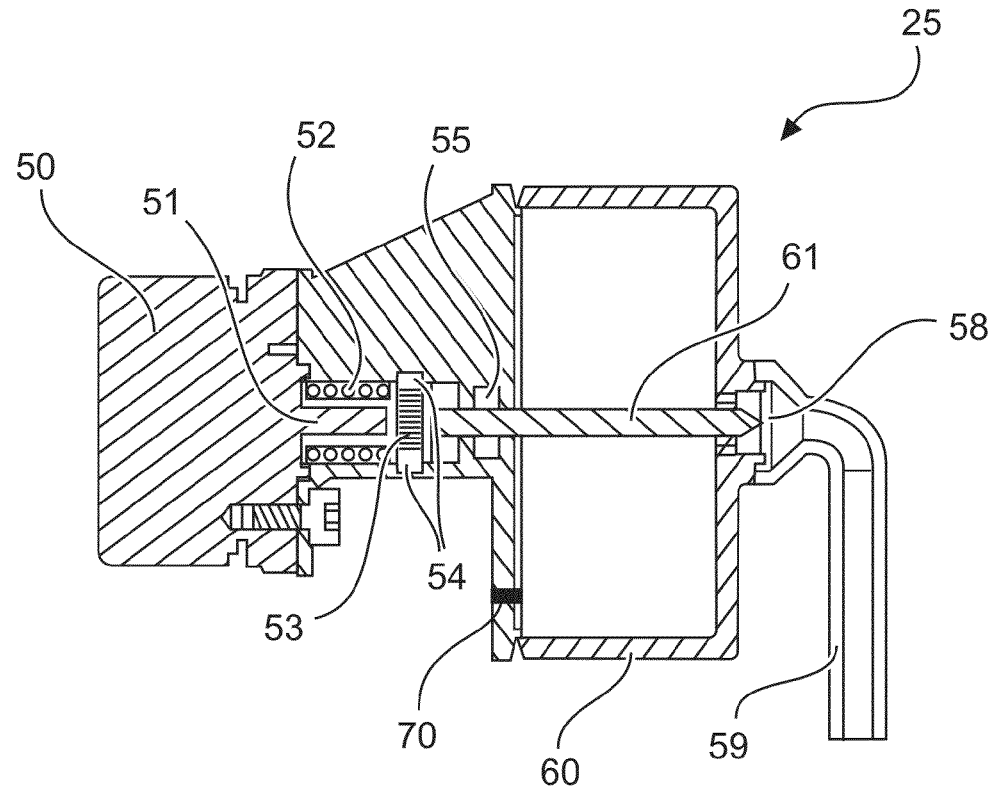

FIG. 4b shows a detail view of one example of the decoupling device 25. In the coupled state of the actuator element, the pneumatic decoupling device 25 has a positive pressure, stored in the pressure accumulator element 60. This positive pressure can be released, on the one hand, by means of the use of the outlet 59, but is held in the pressure accumulator element 60 by means of the sealing element 58. By using the tripping mechanism 61 it is possible to suitably influence the sealing element 58, which is designed, for example, as a rupture disk. For example, the sealing element can be, for example, destroyed, so that the pressure, stored in the pressure accumulator element 60, can be passed through the outlet 59 to an additional element, for example, the decoupling mechanism of an actuator element.

In order to decouple, i.e., to trip the pneumatic decoupling device 25, the motor element 50 can be supplied, for example, with electric energy, so that the pressure piston 61 is released and is moved in the direction of the sealing element 58 by means of the application of the spring force of the second force element 52. By rotating the drive shaft 51 by means of the motor element 50 it is possible, for example, to compress the first force element 53, until the positive engagement of the positive locking element 54 is released, the pressure piston 61 is released and the second force element 52 can force this pressure piston in the direction of the sealing element 58, the rupture disk. In this way the rupture disk is destroyed, so that the compressed gas in the interior of the pressure accumulator element 60 is released and is passed through the outlet 59 to the chamber of an actuator element. If the pressure in the subsequent pressure chamber of the decoupling mechanism of an actuator element rises above a pressure threshold value, then the decoupling mechanism is tripped, as described above in conjunction with the FIGS. 3a, b.

Furthermore, FIG. 4b is a schematic of a pressure determining device 70, mounted on the housing wall to the pressure accumulator element 60. In this case the pressure determining device 70 can provide a purely visual signaling or more specifically an optical signaling of a pressure, in particular of sufficient pressure in the pressure accumulator element 60, or can provide a mechanical indication. For this purpose, after an element has been pushed in the direction of the interior of the pressure accumulator element 60, this element is pushed outwards again, for example, by means of the pressure in the pressure accumulator element 60. Furthermore, the pressure determining device 70 can be designed as an electronic pressure determining device, in particular, as a pressure sensor, which is suitably attached to an additional electronic evaluating device. A test of the tripping mechanism or rather its actuation can be performed by a suitable measurement of a test current by means of the tripping mechanism. In this respect this test current may be below the minimum required current for compressing the first force element 54.

Next FIGS. 5a, b are described as additional exemplary embodiments of the decoupling devices according to the present invention.

The decoupling device 25, according to FIG. 5a, corresponds more or less to a symmetrical and/or twin decoupling device, according to FIGS. 4a, b.

The decoupling device 25 comprises twin tripping mechanisms 61a, b, which, however, are disposed in a common pressure accumulator element 60. Each of the tripping mechanisms 61a, b comprises a sealing element 58a, b, by means of which the tripping mechanism is connected to an outlet 59a, b. Each of the outlets 59a, b leads to an actuator element 3a, b or more specifically its decoupling mechanism. At this point each of the two tripping mechanisms 61a, b can be suitably tripped by an associated motor element 50, so that the pressure in the pressure accumulator element 60 can be released to an actuator element 3a, b by means of the use of one of the outlets 59a, b. At the same time the pressure in the pressure accumulator element 60 can be configured in such a way that there is just enough pressure to trip a single decoupling mechanism of one of the actuator elements 3a, b. As an alternative, the decoupling mechanism in the actuator elements 3a, b can be constructed in such a way that after carrying out the decoupling process, the pressure in the pressure accumulator element 60 can be largely or completely reduced. If, for example, the tripping mechanism 61a is actuated, then the decoupling mechanism of the actuator element 3a is tripped. Then, however, any residual pressure that may be present in the pressure accumulator element 60 will no longer be sufficient to still be able to subsequently trip the decoupling mechanism of the actuator element 3b, in the event that the tripping mechanism 61b destroys the sealing element 58b. An arrangement of a decoupling device, according to FIG. 5a, can be used, for example, in an embodiment of an actuator assembly 24, according to FIG. 2a.

Figure 5B:
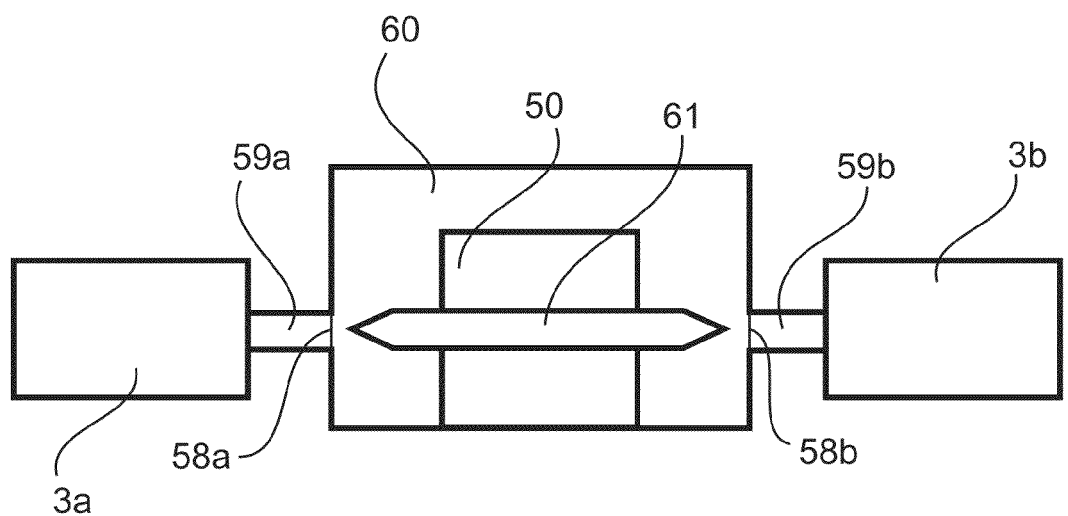

FIG. 5b shows an additional embodiment of a decoupling device.

According to FIG. 5b, the tripping mechanism 61 and its drive by means of the motor element 50 are designed in such a way that only one of the two sealing elements 58a, b can be broken open. In this case the tripping mechanism 61 can be moved by the motor element 50 either to the left, as in FIG. 5b, in order to damage the sealing element 58a and to release the pressure in the pressure accumulator element 60 to the actuator element 3a by means of the use of the outlet 59a; or the motor element 50 can move the tripping mechanism 61 in the opposite direction, in FIG. 5b, to the right, as a result of which the sealing element 59b is destroyed, and the pressure in the pressure accumulator element 60 is released to the actuator element 3b by means of the use of the outlet 59b. Since a single element, the tripping mechanism 61, can be moved exclusively either to the left or to the right by the motor element 50, the decoupling mechanisms of the actuator element 3a and 3b cannot simultaneously trip or rather decouple. Thus, in the embodiment of a pneumatic decoupling device 25, according to FIG. 5b, the design ensures that merely one actuator element 3a, b can be decoupled. Combined with a pressure level in the pressure accumulator element 60 that is adequate enough only to trip a single actuator element, it can be ensured that after the first actuator element is tripped or rather decoupled, the other actuator element can no longer be decoupled.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS 1 motor element
2a, b force transmission
3 actuator element
5a, b attachment points
8, 8a, b drive unit, first and second drive element
10 decoupling mechanism
20a, b aerodynamically effective surface
22 aircraft structure
24 actuator assembly
25 decoupling device
31 ball screw nut
32 adapter
33 pins
34 output piston
35 sliding bearing
36 locking sleeve
37 energy absorbing sleeve
38 tension sleeve
41 chamber
42 seals
43 end stop
44 attachment means
45 locking pins
46 housing
50 motor element
51 drive shaft
52 second force element
53 first force element
54 positive locking element
55 seal
58 sealing element/rupture disk
59 outlet
60 pressure accumulator element
61 tripping mechanism/pressure piston
70 pressure determining device

What is claimed is:

1. A pneumatic decoupling device for an electromechanical actuator element, the pneumatic decoupling device comprising:
a pressure accumulator element with an outlet; and
a tripping mechanism, configured to release pressure stored in the pressure accumulator element in a controlled manner,
wherein the outlet of the pressure accumulator element is configured so that it is coupleable to the electromechanical actuator element, and
wherein the pneumatic decoupling device is configured so that tripping the tripping mechanism releases the pressure stored in the pressure accumulator element to the electromechanical actuator element to trigger a decoupling function in the electromechanical actuator element.

2. The pneumatic decoupling device of claim 1, further comprising:
a pressure determining device configured for determining the pressure in the pressure accumulator element.

3. The pneumatic decoupling device of claim 2, wherein the pressure determining device is a device from the group, consisting of a visual pressure determining device, a mechanical pressure determining device, an electronic pressure determining device or a pressure sensor disposed in the pressure accumulator element.

4. The pneumatic decoupling device of claim 1, wherein
the outlet of the pressure accumulator element comprises at least two outlets, and
the electromechanical actuator element comprises at least two electromechanical actuator elements, each of which is respectively coupleable to one of the at least two outlets,
the tripping mechanism is configured to release the stored pressure to one of the at least two electromechanical actuator element, using one of the at least two outlets,
after releasing the stored pressure to an electromechanical actuator element, the decoupling function of the second electromechanical actuator element can no longer be triggered by the pneumatic decoupling device.

5. The pneumatic decoupling device of claim 4, wherein the tripping mechanism is a single tripping mechanism configured to selectively release the pressure by each of the at least two outlets, or
a multiple tripping mechanism, wherein each of the outlets is assigned a tripping mechanism of the multiple tripping mechanism.

6. The pneumatic decoupling device of claim 1, wherein the tripping mechanism comprises
a positive locking element with a first force element;
a second force element; and
a drive element,
the first force element is configured to hold a positive engagement of the positive locking element;
the drive element is configured to release the positive engagement against the action of the force of the first force element; and
when the positive engagement is released, the second force element is configured to release the pressure stored in the pressure accumulator element via the outlet.

7. The pneumatic decoupling device of claim 6, wherein a direction of force of the first force element is perpendicular to a direction of force of second force element.

8. The pneumatic decoupling device of claim 1, wherein the pressure in the pressure accumulator element is held by a sealing effect of a sealing element in the outlet, and
the tripping mechanism is configured to irreversibly cancel the sealing effect.

9. The pneumatic decoupling device of claim 8, wherein the second force element is configured to exert a force on the sealing element to cancel the sealing effect so that the pressure stored in the pressure accumulator element is released via the outlet.

10. An actuator element, comprising:
a drive unit comprising a first drive element and a second drive element, wherein the first drive element and the second drive element are configured to interact operationally in order to effect a variation in the length of the actuator element; and
a decoupling mechanism, which operationally decouples the actuator element so that the length of the actuator element can vary independently of the drive unit and without operationally decoupling the first drive element and the second drive element,
wherein a decoupling device is operationally coupled to the decoupling mechanism, wherein the decoupling device comprises
a pressure accumulator element with an outlet; and
a tripping mechanism, configured to release pressure stored in the pressure accumulator element in a controlled manner via the outlet to the decoupling mechanism,
wherein the decoupling mechanism is configured so that when the pressure is provided to the decoupling mechanism, the decoupling mechanism operationally decouples the actuator element.

11. The actuator element of claim 10, wherein
the actuator element has two attachment points having a distance that can be adjusted by changing the length of the actuator element,
one of the drive elements is connected in a operatively direct manner to one of the attachment points,
the decoupling mechanism is connected in a operatively direct manner to the other one of the attachment points,
in the coupled state of the decoupling mechanism, the distance between the two attachment points is adjustable by the actuator element, and in the decoupled state of the decoupling mechanism the distance between the two attachment points is adjustable by applying a force to the attachment points from outside.

12. The actuator element of claim 10, wherein
the drive unit is a ball screw, and
the first drive element and the second drive element are a drive spindle and a spindle nut of the ball screw.

13. An actuator assembly, comprising
at least two actuator elements, each comprising
a drive unit comprising a first drive element and a second drive element, wherein the first drive element and the second drive element are configured to interact operationally in order to effect a variation in the length of the actuator element; and
a decoupling mechanism, which operationally decouples the actuator element so that the length of the actuator element can vary independently of the drive unit and without operationally decoupling the first drive element and the second drive element;
wherein the at least two actuator elements are arranged in a force parallel manner, so that a variation in the length of the actuator assembly can be effected by one actuator element alone or by both actuator elements in parallel; and
a decoupling device attached to the at least actuator elements, the decoupling device comprising
a pressure accumulator element with an outlet; and
a tripping mechanism, configured to release pressure stored in the pressure accumulator element in a controlled manner via the outlet to the decoupling mechanism,
wherein the decoupling mechanism is configured so that when the pressure is provided to the decoupling mechanism, the decoupling mechanism operationally decouples the actuator element.
wherein the outlet of the pressure accumulator element comprises at least two outlets,
wherein the electromechanical actuator element comprises at least two electromechanical actuator elements, each of which is respectively coupleable to one of the at least two outlets,
the tripping mechanism is configured to release the stored pressure to one of the at least two electromechanical actuator element, using one of the at least two outlets,
after releasing the stored pressure to an electromechanical actuator element, the decoupling function of the second electromechanical actuator element can no longer be triggered by the pneumatic decoupling device,
wherein the tripping mechanism is
a single tripping mechanism configured to selectively release the pressure by each of the at least two outlets, or
a multiple tripping mechanism, wherein each of the outlets is assigned a tripping mechanism of the multiple tripping mechanism.

14. The actuator assembly of claim 13, wherein
in the case of a defect of a drive unit of an actuator element, the decoupling device trips the decoupling mechanism of this actuator element, so that the actuator element is operationally decoupled,
due to the decoupling, the variation in the length of the actuator assembly can still be effected by the non-decoupled actuator element.

15. An aircraft, comprising:
an actuator element, comprising
- a drive unit comprising a first drive element and a second drive element, wherein the first drive element and the second drive element are configured to interact operationally in order to effect a variation in the length of the actuator element;
- a decoupling mechanism, which operationally decouples the actuator element so that the length of the actuator element can vary independently of the drive unit and without operationally decoupling the first drive element and the second drive element; and a decoupling device operationally coupled to the decoupling mechanism, wherein the decoupling device comprises
- a pressure accumulator element with an outlet; and
- a tripping mechanism, configured to release pressure stored in the pressure accumulator element in a controlled manner via the outlet to the decoupling mechanism, wherein the decoupling mechanism is configured so that when the pressure is provided to the decoupling mechanism, the decoupling mechanism operationally decouples the actuator element.

* * * * *